United States Patent
Ponçot et al.

(10) Patent No.: US 12,548,557 B2
(45) Date of Patent: Feb. 10, 2026

(54) METHOD FOR HUMAN SPEECH PROCESSING

(71) Applicant: TDK CORPORATION, Tokyo (JP)

(72) Inventors: Rémi Louis Clément Ponçot, Grenoble (FR); Abbas Ataya, Menlo Park, CA (US); Peter George Hartwell, Menlo Park, CA (US)

(73) Assignee: TDK CORPORATION, Tokyo (JP)

( * ) Notice: Subject to any disclaimer, the term of this patent is extended or adjusted under 35 U.S.C. 154(b) by 280 days.

(21) Appl. No.: 18/173,699

(22) Filed: Feb. 23, 2023

(65) Prior Publication Data

US 2023/0267919 A1   Aug. 24, 2023

Related U.S. Application Data

(60) Provisional application No. 63/268,431, filed on Feb. 23, 2022.

(51) Int. Cl.
*G10L 15/08* (2006.01)
*G10L 15/30* (2013.01)

(52) U.S. Cl.
CPC .............. *G10L 15/08* (2013.01); *G10L 15/30* (2013.01); *G10L 2015/088* (2013.01)

(58) Field of Classification Search
CPC .... G10L 15/08; G10L 15/30; G10L 2015/088
See application file for complete search history.

(56) References Cited

U.S. PATENT DOCUMENTS

| | | | | |
|---|---|---|---|---|
| 9,070,367 B1* | 6/2015 | Hoffmeister | ............ | G10L 15/30 |
| 12,190,875 B1* | 1/2025 | Fidler | ............ | G10L 15/02 |
| 2013/0085753 A1* | 4/2013 | Bringert | ............ | G10L 15/32 |
| | | | | 704/E15.039 |
| 2015/0006166 A1* | 1/2015 | Schmidt | ............ | G10L 15/30 |
| | | | | 704/231 |
| 2016/0162469 A1* | 6/2016 | Santos | ............ | G10L 15/22 |
| | | | | 704/10 |
| 2022/0036896 A1* | 2/2022 | Elkhatib | ............ | G06N 3/02 |

* cited by examiner

*Primary Examiner* — Sonia L Gay

(57) ABSTRACT

In a method for human speech processing in an automatic speech recognition (ASR) system, human speech is received at a speech interface of the ASR system, wherein the ASR system comprises embedded componentry for onboard processing of the human speech and cloud-based componentry for remote processing of the human speech. A keyword is identified at the speech interface within a first portion of the human speech. Responsive to identifying the keyword, a second portion of the human speech is analyzed to identify at least one command, the second portion following the first portion. The at least one command is identified within the second portion of the human speech. The at least one command is selectively processed within at least one of the embedded componentry and the cloud-based componentry.

8 Claims, 11 Drawing Sheets

METHOD FOR HUMAN SPEECH PROCESSING

RELATED APPLICATION

This application claims priority to and the benefit of U.S. Provisional Patent Application 63/268,431, filed on Feb. 23, 2022, entitled "METHOD FOR IMPROVED KEYWORD SPOTTING," by Poncot, et al., and assigned to the assignee of the present application, which is incorporated herein by reference in its entirety.

BACKGROUND

Automatic speech recognition (ASR) systems, also referred to as conversational interfaces or virtual assistants, are types of user interfaces for computers that emulate human conversation for translating human speech commands into computer-actionable commands. Examples of virtual assistants include Apple's Siri and Amazon's Alexa. A central component to the effectiveness and utility of ASR systems is the lag or latency in analyzing and operating on received human speech.

BRIEF DESCRIPTION OF DRAWINGS

The accompanying drawings, which are incorporated in and form a part of the Description of Embodiments, illustrate various non-limiting and non-exhaustive embodiments of the subject matter and, together with the Description of Embodiments, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1:
FIG. 1 is a block diagram illustrating an example automatic speech recognition (ASR) system, in accordance with embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "identifying," "analyzing," "processing," "determining," "cancelling," "continuing," "comparing," "generating," "confirming," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example ultrasonic sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example automatic speech recognition (ASR) system for human speech processing, according to various embodiments. An example computer system environment, upon which embodiments of the present invention may be implemented, is then described. Example operations of an automatic speech recognition (ASR) system for human speech processing are then described.

Example embodiments described herein provide for low-latency secured embedded keyword spotting with powerful automatic speech recognition by using a hybrid embedded/cloud-based system. For example, low-latency keyword spotting (KWS) is used for small set of command words that need immediate actions on embedded componentry (e.g., MCU/DSP), where cloud-based componentry is used for more complex analysis and actions. In some embodiments, the speech can be analyzed concurrently within the embedded componentry and the cloud-based componentry to identify other command words/sentences that do not need immediate action at the same time. In some embodiments, a dedicated command word (e.g., "cloud") automatically forwards the following speech to the cloud-componentry for executing more complicated tasks. In some embodiments, the speech is analyzed and automatic detection is performed to determine what needs to go the cloud with an output of the command words model.

Embodiments described herein provide for low latency (e.g., less than 50 ms) keyword spotting in an ASR system by preprocessing and force training to learn to trigger prior to completion of the last phoneme. Embodiments described herein provide for chaining a wake-up word with another command word(s) without pauses by using a first model for the wake-up word and then another model for the command word(s). In some embodiments, preprocessing and force training can be used to learn to trigger the second model earlier to catch up with the beginning of the command.

Embodiments described herein provide a method for human speech processing in an automatic speech recognition (ASR) system. Human speech is received at a speech interface of the ASR system, wherein the ASR system comprises embedded componentry for onboard processing of the human speech and cloud-based componentry for remote processing of the human speech. A keyword is identified at the speech interface within a first portion of the human speech. Responsive to identifying the keyword, a second portion of the human speech is analyzed to identify at least one command, the second portion following the first portion. The at least one command is identified within the second portion of the human speech. The at least one command is selectively processed within at least one of the embedded componentry and the cloud-based componentry.

In one embodiment, selectively processing the at least one command within at least one of the embedded componentry and the cloud-based componentry includes concurrently processing the at least one command within the embedded componentry and the cloud-based componentry. It is determined whether the at least one command is executable at the embedded componentry. In one embodiment, it is determined whether the at least one command is within an inventory of commands capable of being processed by the embedded componentry. Provided the at least one command is capable of being processed at the embedded componentry, the at least one command is processed at the embedded componentry and processing of the at least one command at the cloud-based componentry is cancelled. Provided the at least one command is not capable of being processed at the embedded componentry, processing of the at least one command is continued at the cloud-based componentry.

In another embodiment, selectively processing the at least one command within at least one of the embedded componentry and the cloud-based componentry includes comparing the at least one command to an inventory of commands capable of being processed by the embedded componentry. Provided the at least one command is capable of being processed at the embedded componentry according to the inventory of commands, the at least one command is processed at the embedded componentry. Provided the at least one command is not capable of being processed at the embedded componentry, the at least one command is processed at the cloud-based componentry.

In one embodiment, it is determined whether the at least one command is predefined for processing at the cloud-based componentry. Provided the at least one command is predefined for processing at the cloud-based componentry, the at least one command is processed at the cloud-based componentry. In one embodiment, provided the at least one command is predefined for processing at the cloud-based componentry, speech of the second portion is processed following the at least one command at the cloud-based componentry. In one embodiment, provided the at least one command is predefined for processing at the cloud-based componentry, an indication that the at least one command is being processed at the cloud-based componentry is generated.

In another embodiment, selectively processing the at least one command within at least one of the embedded componentry and the cloud-based componentry includes analyzing the at least one command at the embedded componentry to determine whether the at least one command is executable at the embedded componentry. Provided the at least one command is capable of being processed at the embedded componentry, the at least one command is processed at the embedded componentry. Provided the at least one command is not capable of being processed at the embedded componentry, it is determined whether it is necessary to continue processing the at least one command at the cloud-based componentry. In one embodiment, responsive to determining that it is necessary to continue processing the at least one command at the cloud-based componentry, processing of the at least one command at the cloud-based componentry continues.

Example Automatic Speech Recognition (ASR) System for Human Speech Processing

Example embodiments described herein provide a method for human speech processing in an automatic speech recognition (ASR) system. Human speech is received at a speech interface of the ASR system, wherein the ASR system comprises embedded componentry for onboard processing of the human speech and cloud-based componentry for remote processing of the human speech. A keyword is identified at the speech interface within a first portion of the human speech. Responsive to identifying the keyword, a second portion of the human speech is analyzed to identify at least one command, the second portion following the first portion. The at least one command is identified within the second portion of the human speech. The at least one command is selectively processed within at least one of the embedded componentry and the cloud-based componentry.

FIG. 1 is a block diagram illustrating an example system 100 automatic speech recognition (ASR), in accordance with embodiments. In accordance with various embodiments, ASR system 100 includes speech input device 110, input processor 120, and speech output device 130. Input processor 120 includes embedded componentry 122 and cloud-based componentry 124, where cloud-based componentry 124 is communicatively coupled to input processor 120 via cloud-based network 126. It should be appreciated that speech input device 110, input processor 120, and speech output device 130 can be under the control of a single component of an enterprise computing environment (e.g., a distributed computer system or computer system 700) or can be distributed over multiple components (e.g., a virtualization infrastructure or a cloud-based infrastructure). In some embodiments, ASR system 100 is comprised within or is an enterprise system.

User input 105 is received at speech input device 110 (e.g., a microphone) of system 100, where user input 105 is a spoken utterance of a user. In some embodiments, speech input device 110 buffers user input 105, where it is output as buffered speech 115. User input 105 is generally a request for information or execution of an action using an application and is processed at input processor 120. For example, user input 105 can be a wake-up word followed by a command for action to be taken (e.g., "hi TDK, turn off lights inside") or a request for information (e.g., "hi TDK, what is tomorrow's weather?")

In some embodiments, input processor 120, converts spoken words into computer-understandable information and/or commands. At input processor 120, user input 105 is processed such that user input 105 is converted into computer-understandable information and/or commands. In some embodiments, input processor 120 is configured to identify a user intent of user input 105 by parsing the human speech and identifying a keyword within a portion of the human speech and a command within a portion of the human speech following the keyword.

In various embodiments, ASR system 100 operates as a conversational interface, such as a virtual assistant. A keyword is a word or phrase that, when identified by ASR system 100, indicates to the ASR system that a human is attempting to interact with ASR system 100 for issuing commands to ASR system 100. ASR system 100, when operating in a standby mode (e.g., waiting for an interaction), receives and parses human speech to identify a keyword. For example, "Alexa" is a keyword to interact with Amazon's conversational interface and "hey Siri" is a keyword to interact with Apple's conversational interface. Upon identification of a keyword, ASR system 100 analyzes a portion of human speech following the keyword to identify at least one command being issued to ASR system 100.

Input processor 120 is configured to process buffered speech 115 using at least one of embedded componentry 122 and cloud-based componentry 124, where embedded componentry 122 is embedded within local hardware at the location of the user, and where cloud-based componentry 124 is remote to the local hardware, as it is located in the "cloud." Input processor 120 is able to selectively process buffered speech 115, including at least one command, within at least one of embedded componentry 122 and cloud-based componentry 124. In general, embedded componentry 122 is capable of execution of a smaller set of commands than cloud-based componentry 124, but is also capable of faster execution of commands, given its proximity to the source of the user input 105.

Input processor 120 is configured to generate a response 135 to user input 105 by retrieving data responsive to user input 105, or instantiate an action 138, such as directing a device to perform a task responsive to user input 105. For example, where user input 105 is a request for information, input processor 120 retrieves data responsive to the request for information. In some embodiments, input processor 120 determines an application of system 100 that is capable of accessing information or executing actions responsive to user input 105. It should be appreciated that system 100 can include any number or type of applications that can be responsive to user input 105 received at speech input device 110. Moreover, it should be appreciated that an application can in turn communicate with any type of internal or remote data repository for retrieving information responsive to user input 105, or can initiate the execution of any action to be performed by a machine.

Input processor 120 is configured to generate output 125, and communicate the output 125 to output device 130 for execution. Output device 130 is configured to communicate response 135 or to execute action 138.

Figure 2:
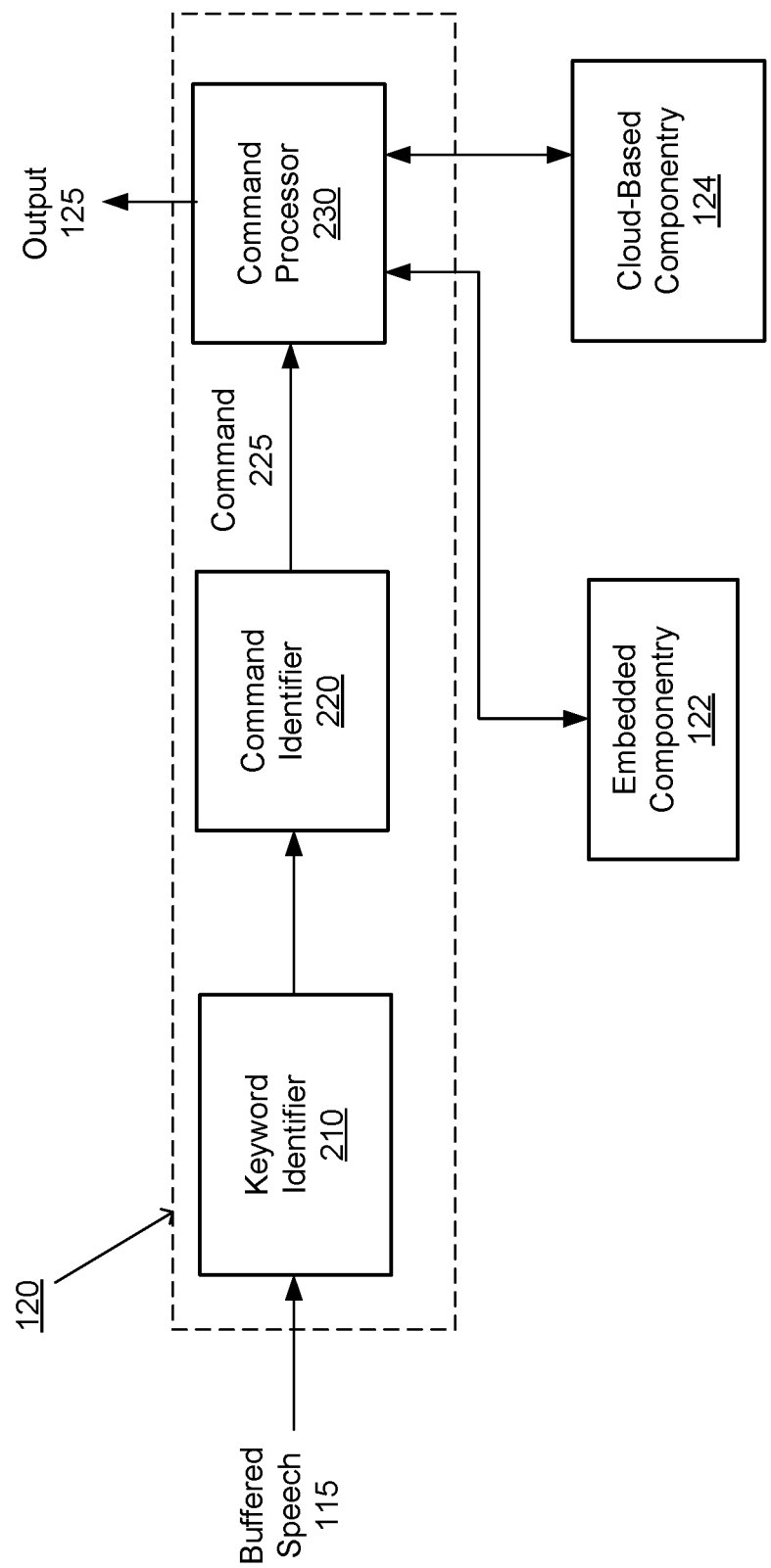
FIG. 2 is a block diagram of an input processor of an ASR system, in accordance with embodiments.

FIG. 2 is a block diagram of an input processor 120 of an ASR system 100, in accordance with embodiments. In accordance with various embodiments, input processor 120 includes keyword identifier 210, command identifier 220, and command processor 230. Keyword identifier 210 receives buffered speech 115 (e.g., from speech input device 110), and is configured to identify a keyword within buffered speech 115. Responsive to identifying a keyword within a first portion of buffered speech 115, command identifier 220 receives a second portion of buffered speech 115, where the second portion follows the first portion. Command identifier 220 is configured to identify one or more commands 225 within the second portion of buffered speech 115.

Responsive to identifying one or more commands 225 within the second portion of buffered speech 115, command processor 230 selectively processes the one or more commands 225 at at least one of embedded componentry 122 and cloud-based componentry 124. Upon partial or complete processing of the one or more commands 225, including words or phrases following the one or more commands 225, command processor 230 generates or communicates output 125 (e.g., to output device 130).

In some embodiments, command identifier 220 determines a confidence level for the identification of one or more commands 225 of buffered speech 115. A confidence level is a determination as to the confidence that a spoken word is accurately identified. In some embodiments, command identifier 220 determines a confidence level for identified words. For example, where speech is garbled or there is detectable background noise, the confidence level of identification of a word (e.g., a command 225) is low. It should be appreciated that a confidence level may be compared to a threshold confidence level, such that if a word is under a threshold confidence level, command identifier 220 determines that command 225 is identified with a low confidence level.

Embodiments described herein provide for low latency (e.g., less than 50 ms) keyword spotting in an ASR system by preprocessing and force training to learn to trigger prior to completion of the keyword. The KWS system can be trained to truncate the end sounds of a word or phrase, allowing for the triggering of the keyword before the end of the keyword, reducing latency over other solutions. The described embodiments are also useful for identifying chained or successive keywords, as the second or successive words are less likely to be missed with early triggering of the previous keywords.

Figure 3:
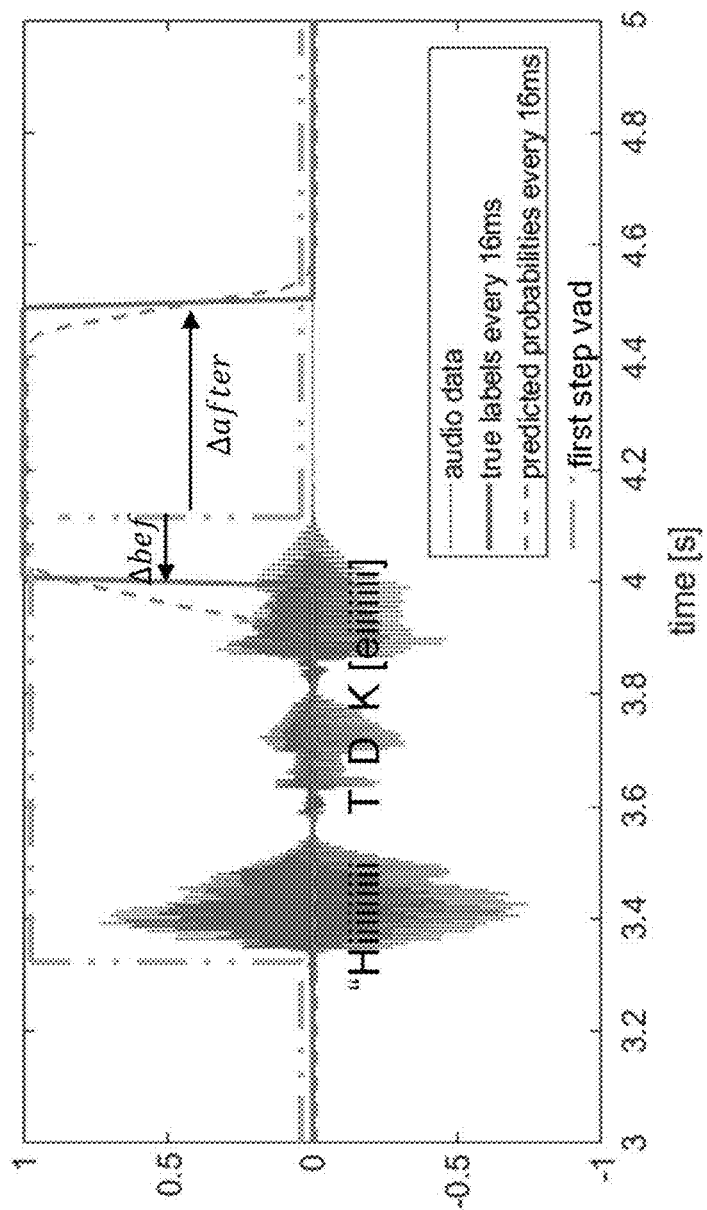
FIG. 3 is a graph illustrating an example training of a trigger for a keyword before the end of the last phoneme of the keyword, according to an embodiment.

FIG. 3 is a graph 300 illustrating an example training of a trigger for a keyword before the end of the last phoneme of the keyword, according to an embodiment. As described herein, embodiments provide for training the system to trigger a keyword before the full enunciation of the keyword is complete. As illustrated in FIG. 3, the triggering of the keyword "Hi TDK" is illustrated. As soon as the system identifies the completion of the hard k sound of the letter K, and during the enunciation of the lagging "eiiiii" sound, the system can be trained to trigger the keyword, where the difference between the end of the keyword and the trigger is indicated as "Δbe". The system can be trained to trigger keywords before their completion, reducing latency for processing the keywords and any following commands, as well as providing for recursive chaining of a keyword, such as a wake-word, with other another command word(s) model(s) to provide a low latency KWS global system.

In one embodiment, voice activity detection on training samples is performed to detect a falling edge. A second step phoneme detection is performed to detect the beginning of last phoneme. The trigger (Δbe) is tuned to provide a lower latency by setting Δbe at least up to the beginning of the last phoneme (or even before the last phoneme, where applicable). In some embodiments, the time after the keyword (Δafter) is tuned to account for voice activity detection frame length uncertainty. It should be appreciated that some training data may be truncated at the end, thereby helping the system recognize a keyword faster and reducing latency. For instance, Δbef and after may be adapted depending on required latency and accuracy, may be set in time or set as a fraction of a keyword, and may be adapted to user (e.g., adjusted according to the way a particular user says keyword a keyword.

Although the described embodiments show the use of audio sensor data, it should be appreciated that the same principle can also be applied to data from other types of sensors. For example, gesture recognition can be performed using motion sensors (e.g., accelerometers, gyroscopes), and the recognition can be done using neural networks. Just like with keyword spotting, the latency can be reduced for gesture recognition by training with adapted sample lengths (Δbet Δafter).

Figure 4:
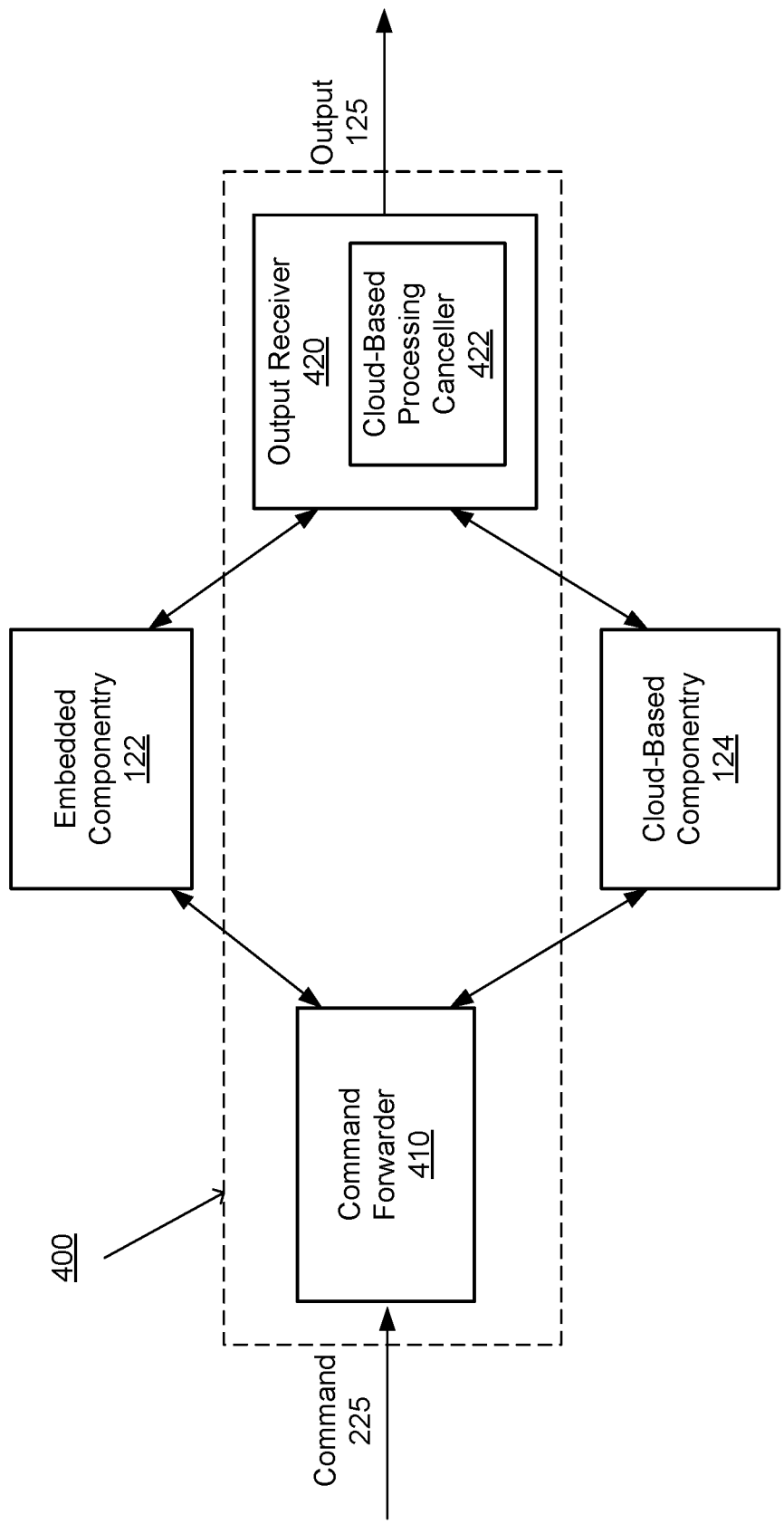
FIG. 4 is a block diagram of a command processor of an ASR system, according to a first embodiment.
Figure 5:
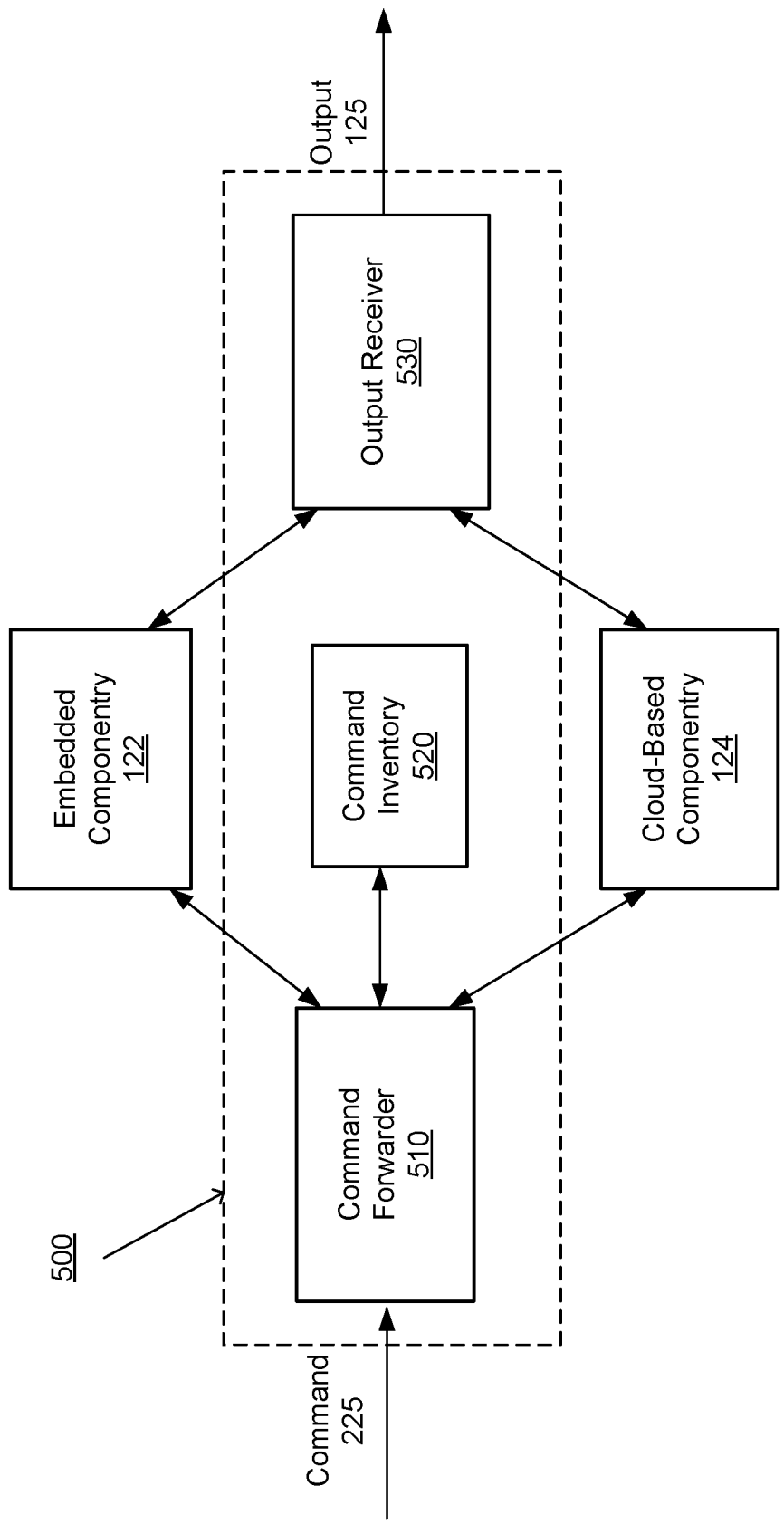
FIG. 5 is a block diagram of a command processor of an ASR system, according to a second embodiment.
Figure 6:
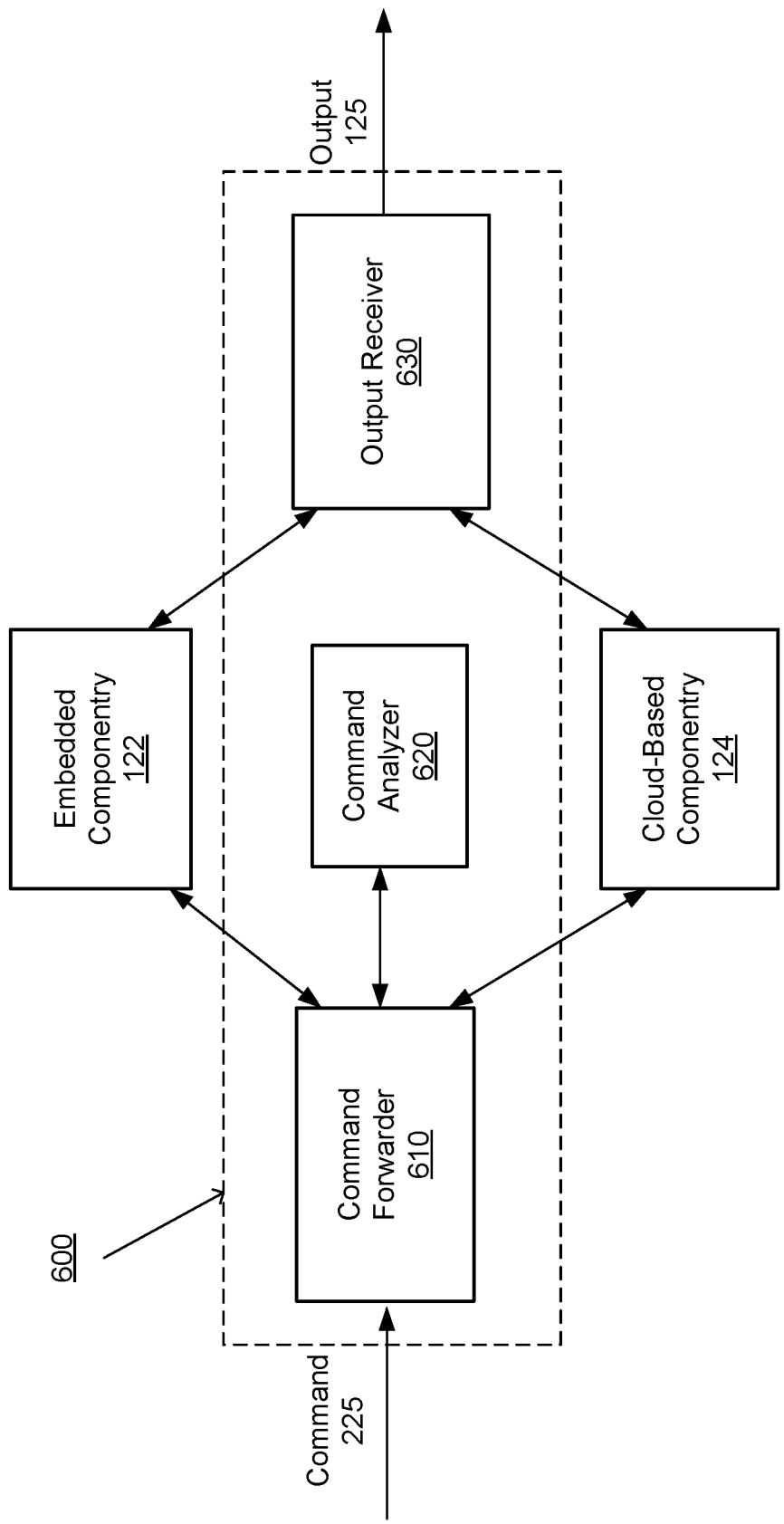
FIG. 6 is a block diagram of a command processor of an ASR system, according to a third embodiment.

In accordance with the described embodiments, ASR system 100 is configured to selectively process at least one command within at least one of the embedded componentry and the cloud-based componentry. For example, in various embodiments, low-latency keyword spotting (KWS) is used for small set of command words that need immediate actions on embedded componentry (e.g., MCU/DSP), where cloud-based componentry is used for more complex analysis and actions. In some embodiments, the speech can be analyzed concurrently within the embedded componentry and the cloud-based componentry to identify other command words/sentences that do not need immediate action at the same time. In some embodiments, a dedicated command word (e.g., "cloud") automatically forwards the following speech to the cloud-componentry for executing more complicated tasks. In some embodiments, the speech is analyzed and automatic detection is performed to determine what needs to go the cloud with an output of the command words mode. FIGS. 4 through 6 illustrate different embodiments of selectively processing at least one command within at least one of the embedded componentry and the cloud-based componentry.

FIG. 4 is a block diagram of a command processor 400 of an ASR system 100, according to a first embodiment. In accordance with one embodiment, command processor 400 is implemented as command processor 230 of FIG. 2. Command processor 400 includes command forwarder 410 and output receiver 420. In the illustrated embodiment, command forwarder 410 receives command 225 (e.g., from command identifier 220 of FIG. 2). Command forwarder 410 is configured to forward command 225 to both embedded componentry 122 and cloud-based componentry 124 for concurrent processing.

For instance, command processor 400 forwards command 225 to both embedded componentry 122 and cloud-based componentry 124 for concurrent processing, where embedded componentry 122, given its proximity to the source of user input 105, is capable of faster execution of those commands for which it is capable of executing. As such, embedded componentry 122 is configured to initiate execution of command 225 concurrent to cloud-based componentry 124.

Provided embedded componentry 122 is capable of processing command 225, command processor 400 receives output 125 from embedded componentry 122 at output receiver 420. In one embodiment, upon determining that embedded componentry 122 is capable of processing command 225, processing of command 225 at cloud-based componentry 124 is cancelled. For example, upon receiving output 125 from embedded componentry 122 at output receiver 420, cloud-based processing canceller 422 of output receiver cancels processing of command 225 at cloud-based componentry 124. It should be appreciated that the determination that embedded componentry 122 is capable of processing command 225 may be received prior to receiving output 125 at output receiver 420 (e.g., as an intermediary determination that embedded componentry 122 is capable of processing command 225). In one embodiment, the determination as to whether embedded componentry 122 is capable of processing command 225 is made by determining whether the command is within an inventory of commands capable of being processed at embedded componentry 122.

In some embodiments, where command 225 is processed at embedded componentry 122, command 225 is identified at command identifier 220 with a low confidence level (e.g., after comparing to a threshold confidence level). Where command 225 is identified with a low confidence level, in some embodiments, cloud-based componentry 124 continues to process command 225 after embedded componentry 122 completes processing of command 225 for confirmation/verification that command 225 was processed properly at embedded componentry 122.

Provided embedded componentry 122 is not capable of processing command 225, command processor 400 receives output 125 from cloud-based componentry 124 at output receiver 420.

FIG. 5 is a block diagram of a command processor 500 of an ASR system 100, according to a second embodiment. In accordance with one embodiment, command processor 500 is implemented as command processor 230 of FIG. 2. Command processor 500 includes command forwarder 510, command inventory 520, and output receiver 530. In the illustrated embodiment, command forwarder 510 receives command 225 (e.g., from command identifier 220 of FIG. 2). Command forwarder 510 is configured to compare command 225 to command inventory 520, where command inventory 520 includes an inventory of commands capable of execution at embedded componentry 122.

Provided embedded componentry 122 is capable of processing command 225, as indicated by command inventory 520, command forwarder 510 forwards commands 225 to embedded componentry 122 for processing. For example, command inventory 520 includes a subset of commands capable of processing by ASR system 100 that are executable at embedded componentry 122, while the remaining commands are capable of processing at cloud-based componentry 124. Command processor 500 receives output 125 from embedded componentry 122 at output receiver 530.

Provided embedded componentry 122 is not capable of processing command 225, as indicated by command inventory 520, command forwarder 510 forwards commands 225 to cloud-based componentry 124 for processing. In some embodiments, a dedicated command word (e.g., "cloud") automatically forwards the following speech to cloud-componentry 124 for executing more complicated tasks. Command processor 500 receives output 125 from cloud-based componentry 124 at output receiver 530.

In some embodiments, for example where a user knows that a particular command word is processable at embedded componentry 122, a dedicated command word (e.g., "local") can indicate that speech that follows the dedicated command word is only processed at embedded componentry 122.

FIG. 6 is a block diagram of a command processor 600 of an ASR system 100, according to a third embodiment. In accordance with one embodiment, command processor 600 is implemented as command processor 230 of FIG. 2. Command processor 600 includes command forwarder 610, command analyzer 620, and output receiver 630. In the illustrated embodiment, command forwarder 610 receives command 225 (e.g., from command identifier 220 of FIG. 2). Command analyzer 620 is configured to analyze command 225 and to determine whether command 225 is for execution at embedded componentry 122 and/or cloud-based componentry 124.

Provided embedded componentry 122 is capable of processing command 225, as determined by command analyzer 620, command forwarder 610 forwards commands 225 to embedded componentry 122 for processing. For example, command analyzer 620 is able to determine whether command 225 is executable at embedded componentry 122. If command analyzer 620 determines that command 225 is executable at embedded componentry 122, command 225 is forwarded to embedded componentry 122. If command analyzer determines that command 225 is not executable at embedded componentry 122, or is an unknown command, command 225 is forwarded to cloud-based componentry. Command processor 600 receives output 125 from embedded componentry 122 at output receiver 630.

Provided embedded componentry 122 is not capable of processing command 225, as determined by command analyzer 620, command forwarder 610 forwards commands 225 to cloud-based componentry 124 for processing. Command processor 600 receives output 125 from cloud-based componentry 124 at output receiver 630.

Figure 7:
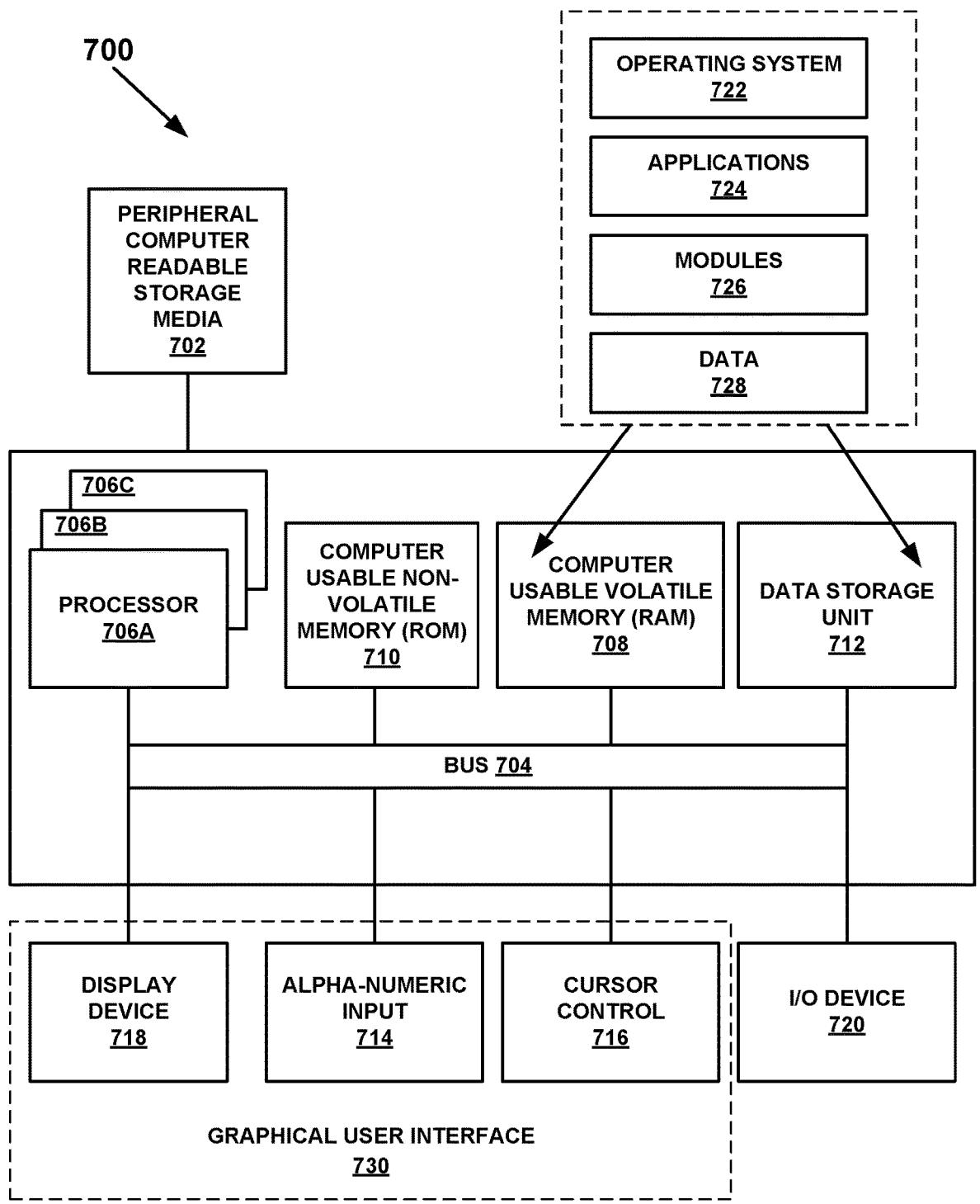
FIG. 7 is a block diagram illustrating an example computer system upon which embodiments of the present invention can be implemented.

FIG. 7 is a block diagram of an example computer system 700 upon which embodiments of the present invention can be implemented. FIG. 7 illustrates one example of a type of computer system 700 (e.g., a computer system) that can be used in accordance with or to implement various embodiments which are discussed herein.

It is appreciated that computer system 700 of FIG. 7 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand-alone computer systems, media centers, handheld computer systems, multi-media devices, and the like. In some embodiments, computer system 700 of FIG. 7 is well adapted to having peripheral tangible computer-readable storage media 702 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 700 of FIG. 7 includes an address/data bus 704 for communicating information, and a processor 706A coupled with bus 704 for processing information and instructions. As depicted in FIG. 7, computer system 700 is also well suited to a multi-processor environment in which a plurality of processors 706A, 706B, and 706C are present. Conversely, computer system 700 is also well suited to having a single processor such as, for example, processor 706A. Processors 706A, 706B, and 706C may be any of various types of microprocessors. Computer system 700 also includes data storage features such as a computer usable volatile memory 708, e.g., random access memory (RAM), coupled with bus 704 for storing information and instructions for processors 706A, 706B, and 706C. Computer system 700 also includes computer usable non-volatile memory 710, e.g., read only memory (ROM), coupled with bus 704 for storing static information and instructions for processors 706A, 706B, and 706C. Also present in computer system 700 is a data storage unit 712 (e.g., a magnetic or optical disc and disc drive) coupled with bus 704 for storing information and instructions. Computer system 700 also includes an alphanumeric input device 714 including alphanumeric and function keys coupled with bus 704 for communicating information and command selections to processor 706A or processors 706A, 706B, and 706C. Computer system 700 also includes a cursor control device 716 coupled with bus 704 for communicating user input information and command selections to processor 706A or processors 706A, 706B, and 706C. In one embodiment, computer system 700 also includes a display device 718 coupled with bus 704 for displaying information.

Referring still to FIG. 7, display device 718 of FIG. 7 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 716 allows the computer user to dynamically signal the movement of a visible symbol (cursor) on a display screen of display device 718 and indicate user selections of selectable items displayed on display device 718. Many implementations of cursor control device 716 are known in the art including a trackball, mouse, touch pad, touch screen, joystick or special keys on alphanumeric input device 714 capable of signaling movement of a given direction or manner of displacement. Alternatively, it will be appreciated that a cursor can be directed and/or activated via input from alphanumeric input device 714 using special keys and key sequence commands. Computer system 700 is also well suited to having a cursor directed by other means such as, for example, voice commands. In various embodiments, alphanumeric input device 714, cursor control device 716, and display device 718, or any combination thereof (e.g., user interface selection devices), may collectively operate to provide a graphical user interface (GUI) 730 under the direction of a processor (e.g., processor 706A or processors 706A, 706B, and 706C). GUI 730 allows user to interact with computer system 700 through graphical representations presented on display device 718 by interacting with alphanumeric input device 714 and/or cursor control device 716.

Computer system 700 also includes an I/O device 720 for coupling computer system 700 with external entities. For example, in one embodiment, I/O device 720 is a modem for enabling wired or wireless communications between computer system 700 and an external network such as, but not limited to, the Internet. In one embodiment, I/O device 720 includes a transmitter. Computer system 700 may communicate with a network by transmitting data via I/O device 720. In accordance with various embodiments, I/O device 720 includes a microphone for receiving human voice or speech input (e.g., for use in a conversational or natural language interface).

Referring still to FIG. 7, various other components are depicted for computer system 700. Specifically, when present, an operating system 722, applications 724, modules 726, and data 728 are shown as typically residing in one or some combination of computer usable volatile memory 708 (e.g., RAM), computer usable non-volatile memory 710 (e.g., ROM), and data storage unit 712. In some embodiments, all or portions of various embodiments described herein are stored, for example, as an application 724 and/or module 726 in memory locations within RAM 708, computer-readable storage media within data storage unit 712, peripheral computer-readable storage media 702, and/or other tangible computer-readable storage media.

Example Methods of Operation

The following discussion sets forth in detail the operation of some example methods of operation of embodiments. With reference to FIGS. 8 through 11, flow diagrams 800, 900, 1000, and 1100 illustrate example procedures used by various embodiments. The flow diagrams include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 700). The computer-readable and computer-executable instructions, which reside on tangible computer readable storage media, are used to control, or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited for performing various other procedures or variations of the procedures recited in the flow diagram. Likewise, in some embodiments, the procedures in the flow diagrams may be performed in an order different than presented and/or not all the procedures described in the flow diagrams may be performed. It is further appreciated that procedures described in the flow diagrams may be implemented in hardware, or a combination of hardware with firmware and/or software provided by computer system 700.

Figure 8:
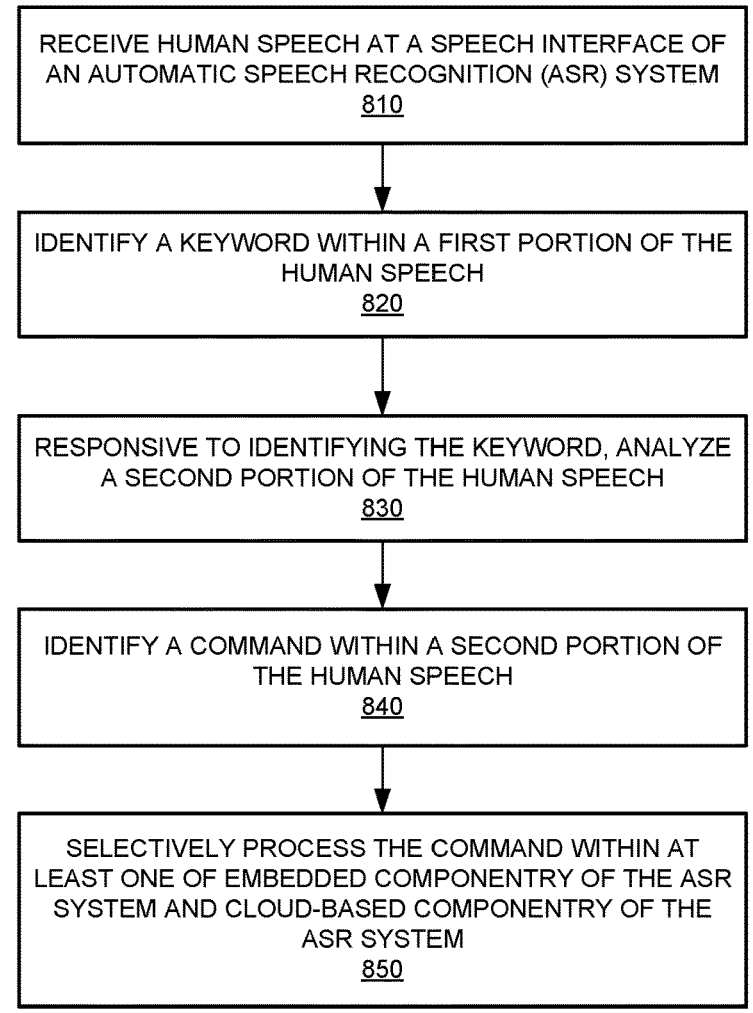
FIG. 8 is a flow diagram illustrating an example method for human speech processing in an ASR system, according to embodiments.

FIG. 8 is a flow diagram 800 illustrating an example method for human speech processing in an automatic speech recognition (ASR) system, according to embodiments. At procedure 810 of flow diagram 800, human speech is received at a speech interface of the ASR system, wherein the ASR system comprises embedded componentry for onboard processing of the human speech and cloud-based componentry for remote processing of the human speech. At procedure 820, a keyword is identified at the speech interface within a first portion of the human speech. At procedure 830, responsive to identifying the keyword, a second portion of the human speech is analyzed to identify at least one command, the second portion following the first portion. At procedure 840, the at least one command is identified within the second portion of the human speech. At procedure 850, the at least one command is selectively processed within at least one of the embedded componentry and the cloud-based componentry.

Figure 9:
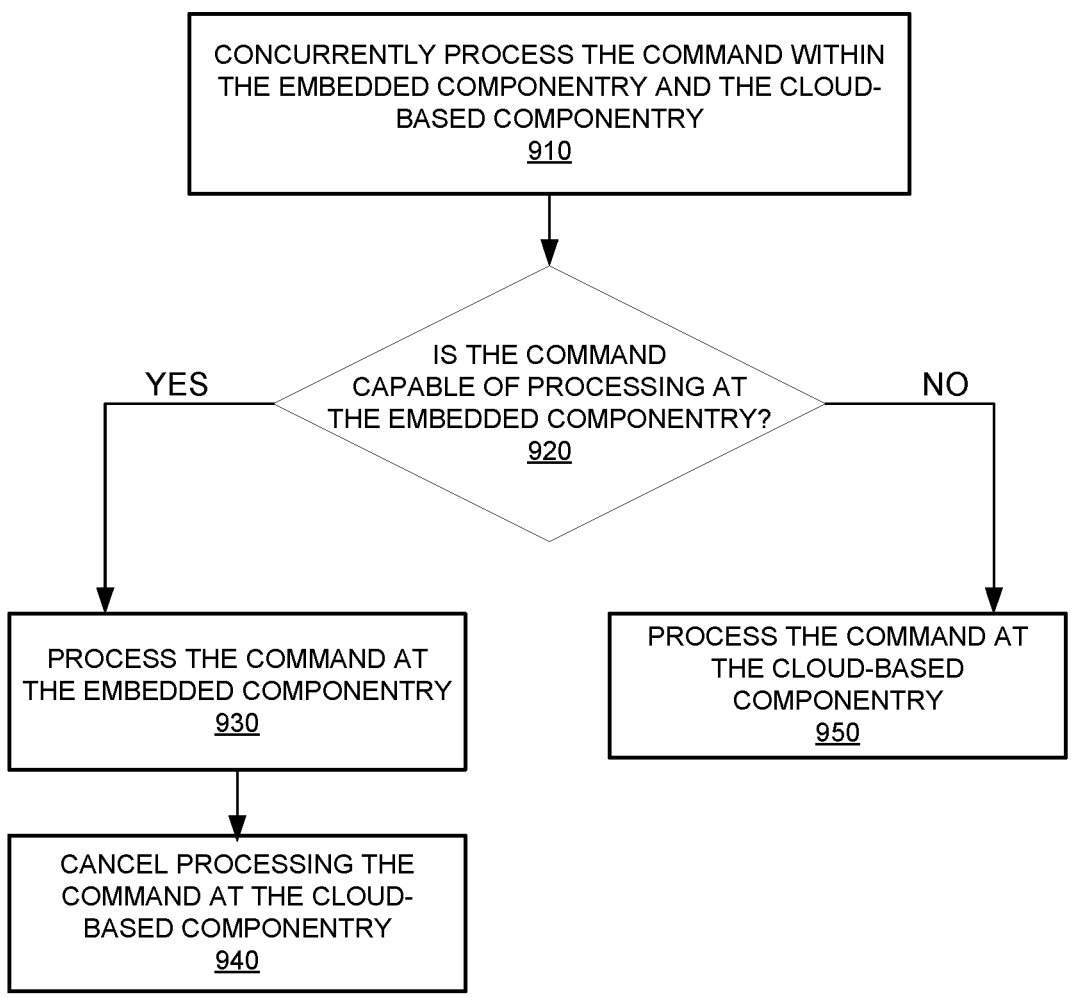
FIGS. 9 through 11 are flow diagrams illustrating example methods for selectively processing a command at at least one of embedded componentry of the ASR system and cloud-based componentry of the ASR system, according to embodiments.
Figure 10:
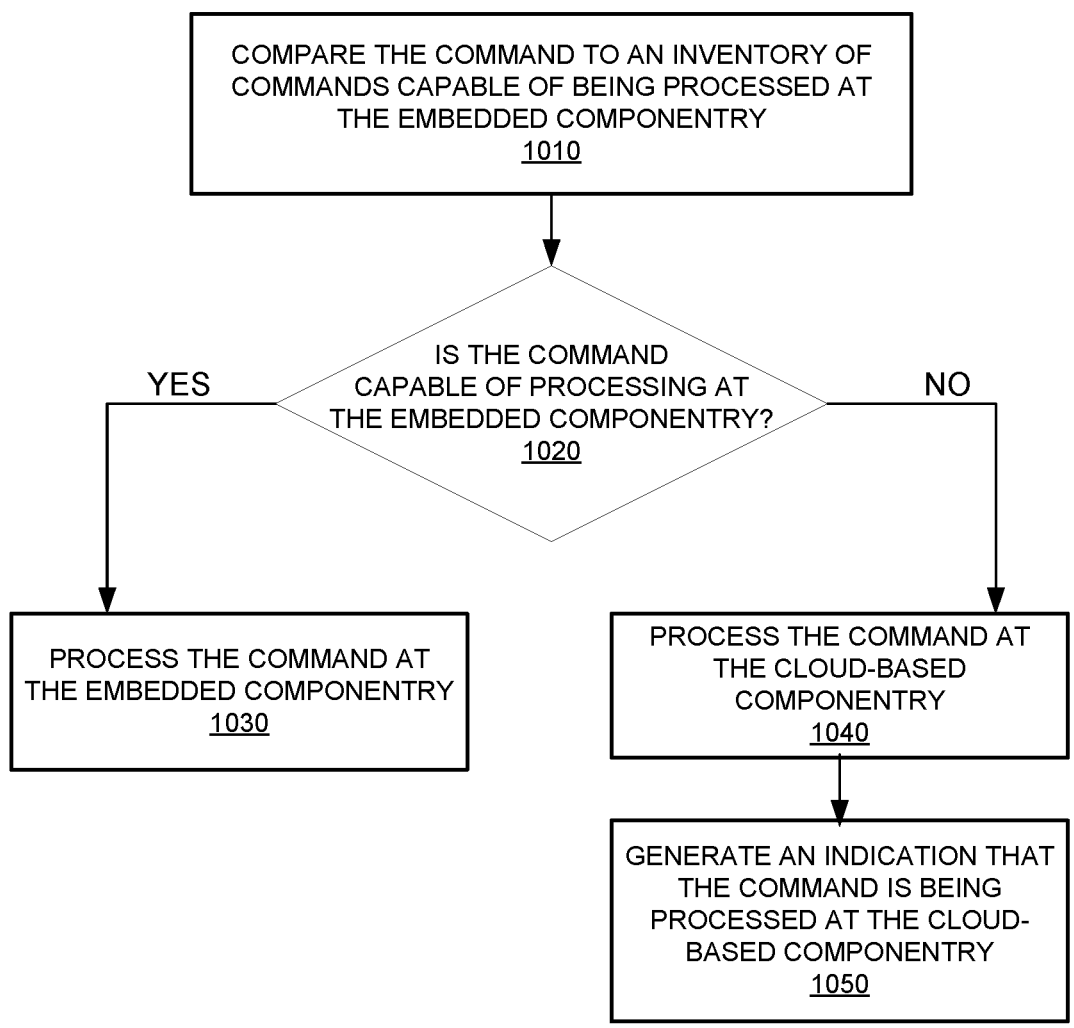
Figure 11:
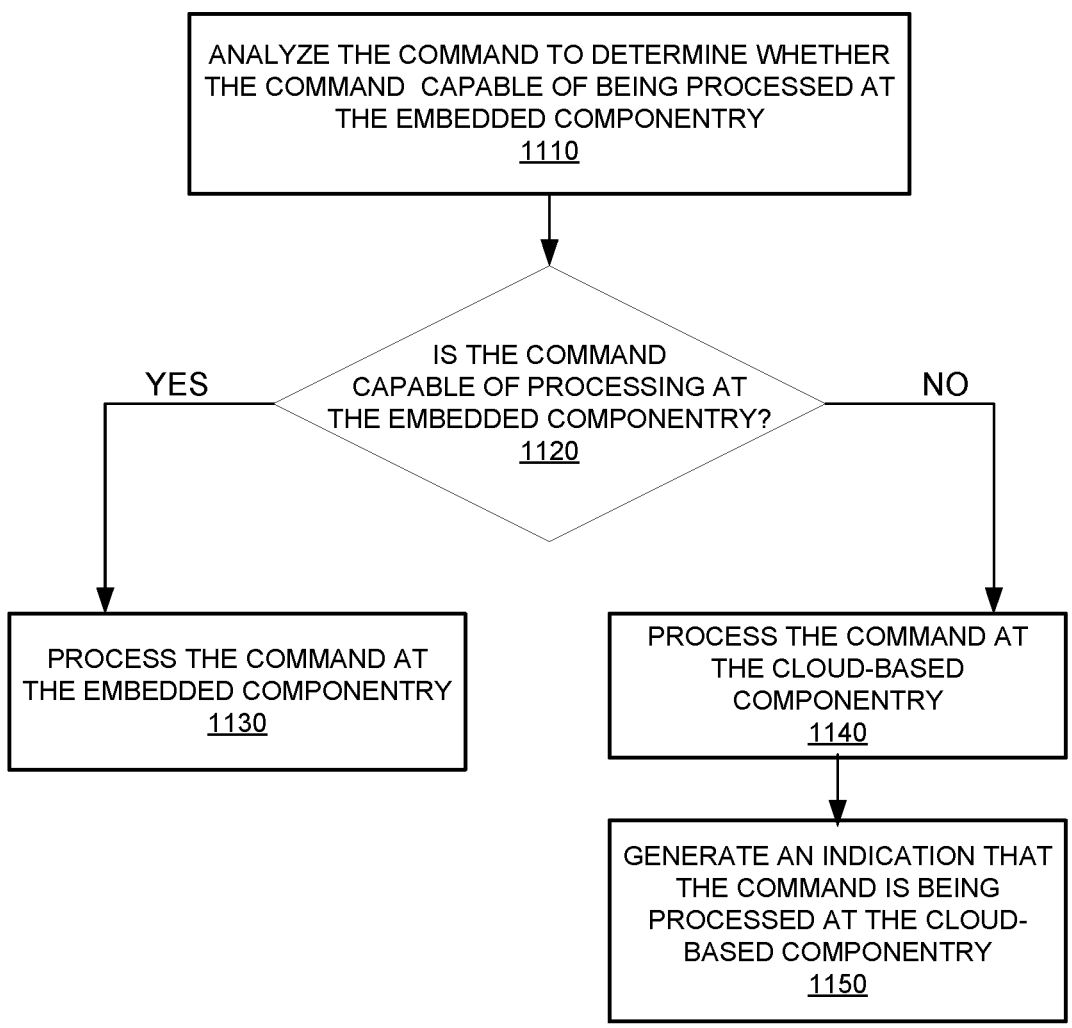

In various embodiments, procedure 850 is performed according to one of flow diagrams 900 of FIG. 9, flow diagram 1000 of FIG. 10, and flow diagram 1100 of FIG. 11. FIGS. 9 through 11 are flow diagrams illustrating example methods for selectively processing a command at at least one of embedded componentry of the ASR system and cloud-based componentry of the ASR system, according to embodiments.

FIG. 9 is a flow diagram 900 illustrating an example method for selectively processing a command at at least one of embedded componentry of the ASR system and cloud-based componentry of the ASR system, according to an embodiment. At procedure 910 of flow diagram 900, the at least one command is concurrently processed within the embedded componentry and the cloud-based componentry. At procedure 920, it is determined whether the at least one command is executable at the embedded componentry. In one embodiment, it is determined whether the at least one command is within an inventory of commands capable of being processed by the embedded componentry. As shown at procedure 930, provided the at least one command is capable of being processed at the embedded componentry, the at least one command is processed at the embedded componentry. At procedure 940, processing of the at least one command at the cloud-based componentry is cancelled. At procedure 950, provided the at least one command is not capable of being processed at the embedded componentry, processing of the at least one command is continued at the cloud-based componentry.

FIG. 10 is a flow diagram 1000 illustrating an example method for selectively processing a command at at least one of embedded componentry of the ASR system and cloud-based componentry of the ASR system, according to a second embodiment. At procedure 1010 of flow diagram 1000, the at least one command is compared to an inventory of commands capable of being processed by the embedded componentry. At procedure 1020, it is determined whether the at least one command is executable at the embedded componentry. As shown at procedure 1030, provided the at least one command is capable of being processed at the embedded componentry according to the inventory of commands, the at least one command is processed at the embedded componentry. In some embodiments, the inventory of commands includes a dedicated command word (e.g., "cloud") that results in automatically forwarding the following speech to the cloud-componentry for executing more complicated tasks. As shown at procedure 1040, provided the at least one command is not capable of being processed at the embedded componentry, the at least one command is processed at the cloud-based componentry.

In one embodiment, it is determined whether the at least one command is predefined for processing at the cloud-based componentry. Provided the at least one command is predefined for processing at the cloud-based componentry, the at least one command is processed at the cloud-based componentry. In one embodiment, provided the at least one command is predefined for processing at the cloud-based componentry, speech of the second portion is processed following the at least one command at the cloud-based componentry. In one embodiment, as shown at procedure 1050, provided the at least one command is predefined for processing at the cloud-based componentry, an indication that the at least one command is being processed at the cloud-based componentry is generated.

FIG. 11 is a flow diagram 1100 illustrating an example method for selectively processing a command at at least one of embedded componentry of the ASR system and cloud-based componentry of the ASR system, according to a second embodiment. At procedure 1110 of flow diagram 1100, the at least one command is analyzed to determine whether it is capable of being processed by the embedded componentry. At procedure 1120, it is determined whether the at least one command is executable at the embedded componentry. As shown at procedure 1130, provided the at least one command is capable of being processed at the embedded componentry according to the inventory of commands, the at least one command is processed at the embedded componentry. As shown at procedure 1140, provided the at least one command is not capable of being processed at the embedded componentry, the at least one command is processed at the cloud-based componentry. In one embodiment, as shown at procedure 1150, provided the at least one command is predefined for processing at the cloud-based componentry, an indication that the at least one command is being processed at the cloud-based componentry is generated.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

The invention claimed is:

1. A method for human speech processing in an automatic speech recognition (ASR) system, the method comprising:
receiving human speech at a speech interface of the ASR system, wherein the ASR system comprises embedded componentry for onboard processing of the human speech and cloud-based componentry for remote processing of the human speech;
identifying a keyword at the speech interface within a first portion of the human speech, wherein the keyword is identified prior to completion of a last phoneme of the keyword;
responsive to identifying the keyword, analyzing a second portion of the human speech to identify at least one command, the second portion following the first portion;
identifying the at least one command within the second portion of the human speech;
forwarding the at least one command to the embedded componentry and the cloud-based componentry; and
concurrently processing the at least one command within the embedded componentry and the cloud-based componentry.

2. The method of claim 1, wherein the selectively processing the at least one command within at least one of the embedded componentry and the cloud-based componentry comprises:
determining whether the at least one command is executable at the embedded componentry;
provided the at least one command is capable of being processed at the embedded componentry, processing the at least one command at the embedded componentry and canceling processing of the at least one command at the cloud-based componentry; and
provided the at least one command is not capable of being processed at the embedded componentry, continuing processing the at least one command at the cloud-based componentry.

3. The method of claim 2, wherein the determining whether the at least one command is executable at the embedded componentry comprises:
determining whether the at least one command is within an inventory of commands capable of being processed by the embedded componentry.

4. A non-transitory computer readable storage medium having computer readable program code stored thereon for causing a computer system to perform a method for human speech processing in an automatic speech recognition (ASR) system, the method comprising:
receiving human speech at a speech interface of the ASR system, wherein the ASR system comprises embedded componentry for onboard processing of the human speech and cloud-based componentry for remote processing of the human speech;
identifying a keyword at the speech interface within a first portion of the human speech, wherein the keyword is identified prior to completion of a last phoneme of the keyword;
responsive to identifying the keyword, analyzing a second portion of the human speech to identify at least one command, the second portion following the first portion;
identifying the at least one command within the second portion of the human speech;
forwarding the at least one command to the embedded componentry and the cloud-based componentry; and
concurrently processing the at least one command within the embedded componentry and the cloud-based componentry.

5. The computer readable storage medium of claim 4, wherein the selectively processing the at least one command within at least one of the embedded componentry and the cloud-based componentry comprises:
determining whether the at least one command is executable at the embedded componentry;
provided the at least one command is capable of being processed at the embedded componentry, processing the at least one command at the embedded componentry and canceling processing of the at least one command at the cloud-based componentry; and
provided the at least one command is not capable of being processed at the embedded componentry, continuing processing the at least one command at the cloud-based componentry.

6. The computer readable storage medium of claim 5, wherein the determining whether the at least one command is executable at the embedded componentry comprises:
determining whether the at least one command is within an inventory of commands capable of being processed by the embedded componentry.

7. A computer system comprising:
a data storage unit; and
a processor coupled with the data storage unit, the processor configured to:
receive human speech at a speech interface of an automatic speech recognition (ASR) system, wherein the ASR system comprises embedded componentry for onboard processing of the human speech and cloud-based componentry for remote processing of the human speech;
identify a keyword at the speech interface within a first portion of the human speech, wherein the keyword is identified prior to completion of a last phoneme of the keyword;
analyze a second portion of the human speech to identify at least one command responsive to identifying the keyword, the second portion following the first portion;
identify the at least one command within the second portion of the human speech;
forward the at least one command to the embedded componentry and the cloud-based componentry; and
concurrently process the at least one command within the embedded componentry and the cloud-based componentry.

8. The computer system of claim 7, wherein the processor is further configured to:
determine whether the at least one command is executable at the embedded componentry;
process the at least one command at the embedded componentry provided the at least one command is capable of being processed at the embedded componentry; and
process the at least one command at the cloud-based componentry provided the at least one command is not capable of being processed at the embedded componentry.

* * * * *